US012432276B2

(12) United States Patent
Virgen et al.

(10) Patent No.: US 12,432,276 B2
(45) Date of Patent: Sep. 30, 2025

(54) AUGMENTING BROKER CAPABILITIES ON MASSIVE IoT SCENARIOS

(71) Applicant: International Business Machines Corporation, Armonk, NY (US)

(72) Inventors: Paul Llamas Virgen, Guadalajara (MX); Jesus Gabriel Trillo Vargas, Toronto (CA); Su Liu, Austin, TX (US); Jeffrey Alan Schmidt, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/215,356

(22) Filed: Jun. 28, 2023

(65) Prior Publication Data

US 2025/0007981 A1      Jan. 2, 2025

(51) Int. Cl.
*H04L 67/12*       (2022.01)
*G16Y 30/00*       (2020.01)
*G16Y 40/10*       (2020.01)

(52) U.S. Cl.
CPC .............. *H04L 67/12* (2013.01); *G16Y 30/00* (2020.01); *G16Y 40/10* (2020.01)

(58) Field of Classification Search
CPC ..................................................... G16Y 30/00
See application file for complete search history.

(56) References Cited

U.S. PATENT DOCUMENTS

| 10,826,979 B2 | 11/2020 | Huh et al. | |
|---|---|---|---|
| 2017/0171728 A1* | 6/2017 | Aiuto | H04W 4/21 |
| 2020/0145409 A1 | 5/2020 | Pochuev et al. | |
| 2021/0099324 A1* | 4/2021 | Choi | G06N 3/044 |
| 2021/0125143 A1* | 4/2021 | Bartlett | G06Q 10/0832 |
| 2022/0122458 A1* | 4/2022 | Dao | G06Q 20/145 |
| 2022/0198921 A1* | 6/2022 | Kangasrääsiö | G08G 1/0116 |
| 2022/0299492 A1* | 9/2022 | Sawadogo | F24F 11/58 |
| 2023/0308374 A1* | 9/2023 | Wang | H04L 43/0876 |

FOREIGN PATENT DOCUMENTS

| WO | WO 2019/178149 A1 | 9/2019 |
|---|---|---|
| WO | WO-2024248682 A1 * | 12/2024 |

OTHER PUBLICATIONS

Mel, et al. "The NIST Definition of Cloud Computing". Recommendations of the National Institute of Standards and Technology. Nov. 16, 2015.

(Continued)

*Primary Examiner* — Chris Parry
*Assistant Examiner* — Abderrahmen Chouat
(74) *Attorney, Agent, or Firm* — Jeffrey Ingalls

(57) ABSTRACT

A broker capability augmenting method, system, and computer program product for increasing a capability of a Message Queuing Telemetry Transfer (MQTT) broker in an Internet-of-Things (IoT) network including obtaining data from an IoT neighborhood to detect an IoT network topology over time, collecting data from IoT devices in the IoT neighborhood, defining an input parameter to a machine learning model, and training the machine learning model on the collected data and the input parameter.

17 Claims, 9 Drawing Sheets

(56) References Cited

OTHER PUBLICATIONS

Alzahrani, et al., " Artificial Intelligence Algorithms for Detecting and Classifying MQTT Protocol Internet of Things Attacks" Electronics 2022, 11, 3837. https://doi.org/10.3390/electronics11223837, Nov. 2022.

Gopalkrishna, et al., " Deep IoT Monitoring: Filtering IoT Traffic Using Deep Learning", SVCC 2022, CCIS 1683, pp. 120-136, 2022.

Vaccari, et al., "Exploiting Internet of Things Protocols for Malicious Data Exfiltration Activities", IEEE vol. 9, 2021.

Unknown, "MQTT", Retrieved from: https://en.wikipedia.org/wiki/MQTT, 1999, 7 pages.

Segarra, What is Killing Your IoT Device's Battery?, Retrieved from: https://soracom.io/blog/what-is-killing-your-iot-devices-battery/, Mar. 30, 2022, 7 pages.

Unknown, "Agriculture IoT Market by Hardware, Application (Precision Farming, Precision Forestry, Precision Livestock, Precision Aquaculture, Smart Greenhouse), Farm Size, Production Stage, and Geography", Retrieved from: https://www.marketsandmarkets.com/Market-Reports/iot-in-agriculture-market-199564903.html?gclid=EAlalQobChMI0LiT-LjA_QIVPROtBh352QiZEAAYAiAAEgJ1BfD_BWE, May 2021, 12 pages.

Unknown, "IBM Environmental Intelligence Suite", Retrieved from: https://web.archive.org/web/20230201071220/https://www.ibm.com/products/environmental-intelligence-suite/agriculture, Retrieval date: Feb. 1, 2023, 4 pages.

Unknown, "MQTT: The Standard for IoT Messaging", Retrieved from: https://web.archive.org/web/20220107064223/https://mqtt.org/, Retrieval date: Jan. 7, 2022, 4 pages.

\* cited by examiner

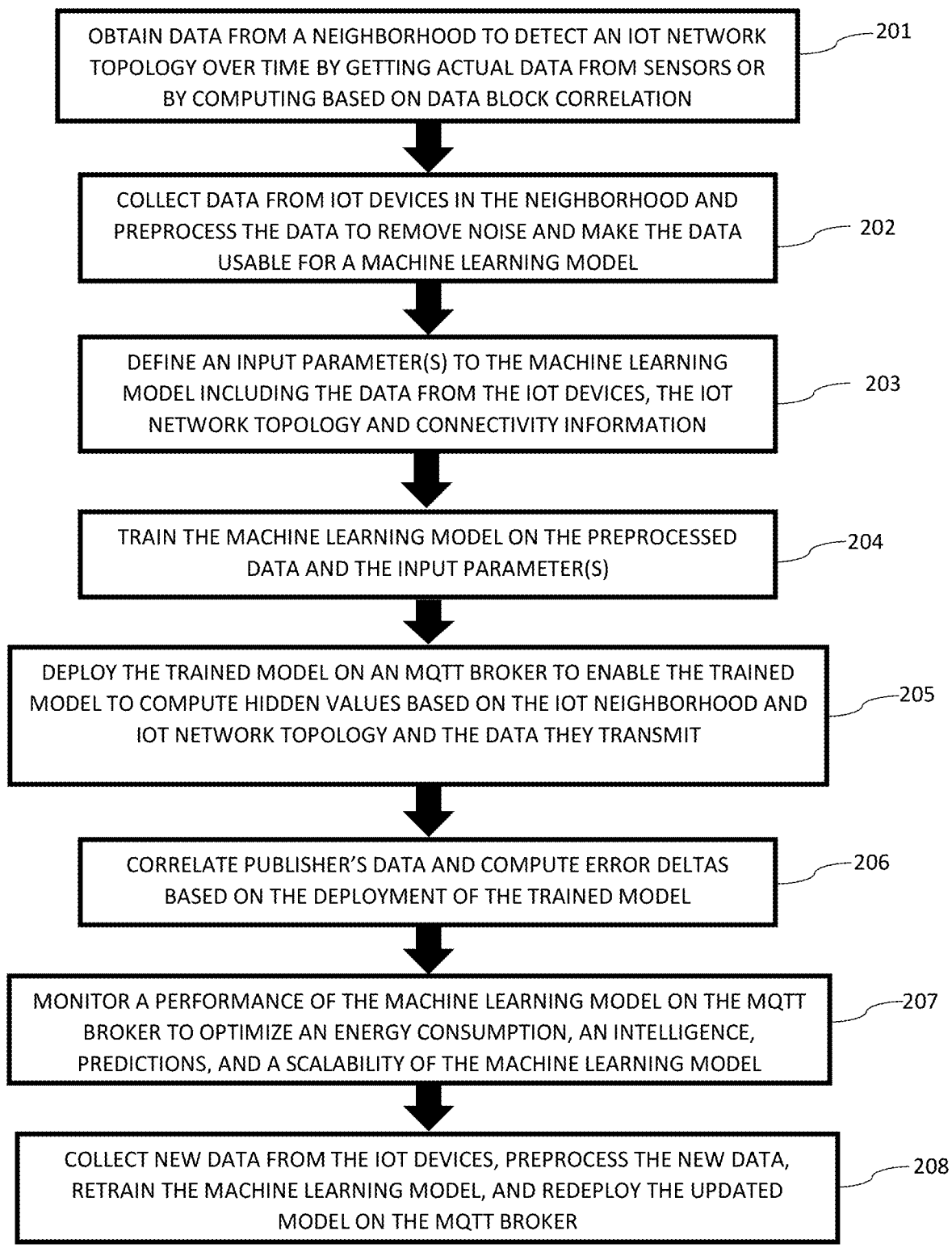

OBTAIN DATA FROM A NEIGHBORHOOD TO DETECT AN IOT NETWORK TOPOLOGY OVER TIME BY GETTING ACTUAL DATA FROM SENSORS OR BY COMPUTING BASED ON DATA BLOCK CORRELATION — 201

COLLECT DATA FROM IOT DEVICES IN THE NEIGHBORHOOD AND PREPROCESS THE DATA TO REMOVE NOISE AND MAKE THE DATA USABLE FOR A MACHINE LEARNING MODEL — 202

DEFINE AN INPUT PARAMETER(S) TO THE MACHINE LEARNING MODEL INCLUDING THE DATA FROM THE IOT DEVICES, THE IOT NETWORK TOPOLOGY AND CONNECTIVITY INFORMATION — 203

TRAIN THE MACHINE LEARNING MODEL ON THE PREPROCESSED DATA AND THE INPUT PARAMETER(S) — 204

DEPLOY THE TRAINED MODEL ON AN MQTT BROKER TO ENABLE THE TRAINED MODEL TO COMPUTE HIDDEN VALUES BASED ON THE IOT NEIGHBORHOOD AND IOT NETWORK TOPOLOGY AND THE DATA THEY TRANSMIT — 205

CORRELATE PUBLISHER'S DATA AND COMPUTE ERROR DELTAS BASED ON THE DEPLOYMENT OF THE TRAINED MODEL — 206

MONITOR A PERFORMANCE OF THE MACHINE LEARNING MODEL ON THE MQTT BROKER TO OPTIMIZE AN ENERGY CONSUMPTION, AN INTELLIGENCE, PREDICTIONS, AND A SCALABILITY OF THE MACHINE LEARNING MODEL — 207

COLLECT NEW DATA FROM THE IOT DEVICES, PREPROCESS THE NEW DATA, RETRAIN THE MACHINE LEARNING MODEL, AND REDEPLOY THE UPDATED MODEL ON THE MQTT BROKER — 208

300

400

FIG. 5
500
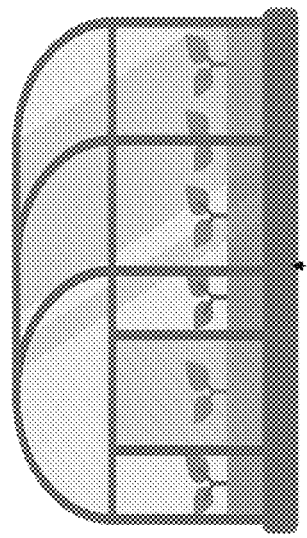
A sub-set of IoT sensors.
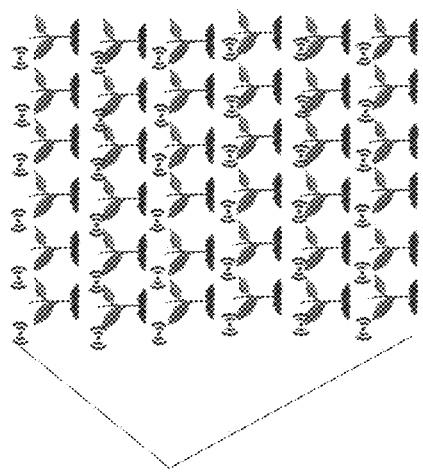
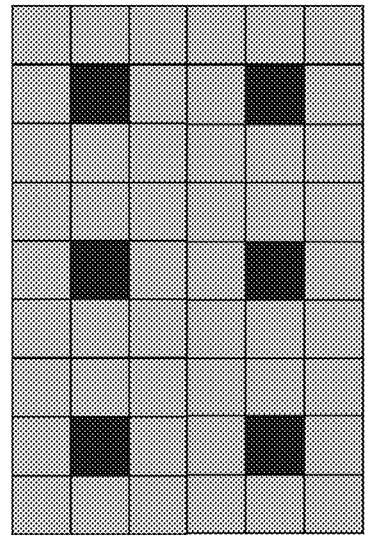
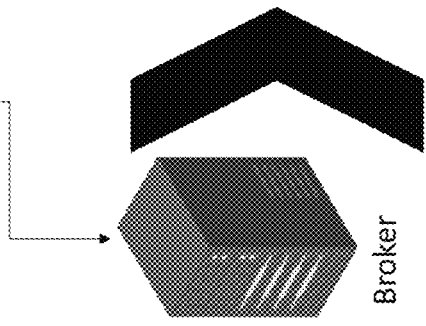
Broker
■ Actual data coming from sensors
▨ Virtual data computation from neighborhood values and trained model

600

800

900

AUGMENTING BROKER CAPABILITIES ON MASSIVE IoT SCENARIOS

BACKGROUND

The present invention relates generally to a broker capability augmenting method, and more particularly, but not by way of limitation, to a system, method, and computer program product to increase broker capabilities on Internet-of-Things (IoT) environments.

Message Queuing Telemetry Transfer (MQTT) is a client server publish/subscribe messaging transport protocol.

SUMMARY

In an exemplary embodiment, the present invention can provide a computer-implemented method for increasing a capability of a Message Queuing Telemetry Transfer (MQTT) broker in an Internet-of-Things (IoT) network including obtaining data from an IoT neighborhood to detect an IoT network topology over time, collecting data from IoT devices in the IoT neighborhood, defining an input parameter to a machine learning model, and training the machine learning model on the collected data and the input parameter.

In another exemplary embodiment, the present invention can provide a broker capability augmenting computer program product for increasing a capability of a Message Queuing Telemetry Transfer (MQTT) broker in an Internet-of-Things (IoT) network, the broker capability augmenting computer program product comprising a computer-readable storage medium having program instructions embodied therewith, the program instructions executable by a computer to cause the computer to perform: obtaining data from an IoT neighborhood to detect an IoT network topology over time, collecting data from IoT devices in the IoT neighborhood, defining an input parameter to a machine learning model, and training the machine learning model on the collected data and the input parameter.

In another exemplary embodiment, the present invention can provide a broker capability augmenting system for increasing a capability of a Message Queuing Telemetry Transfer (MQTT) broker in an Internet-of-Things (IoT) network, the broker capability augmenting system including: a processor, and a memory, the memory storing instructions to cause the processor to perform: obtaining data from an IoT neighborhood to detect an IoT network topology over time, collecting data from IoT devices in the IoT neighborhood, defining an input parameter to a machine learning model, and training the machine learning model on the collected data and the input parameter.

Other details and embodiments of the invention will be described below, so that the present contribution to the art can be better appreciated. Nonetheless, the invention is not limited in its application to such details, phraseology, terminology, illustrations and/or arrangements set forth in the description or shown in the drawings.

Rather, the invention is capable of embodiments in addition to those described and of being practiced and carried out in various ways and should not be regarded as limiting.

As such, those skilled in the art will appreciate that the conception upon which this disclosure is based may readily be utilized as a basis for the designing of other structures, methods and systems for carrying out the several purposes (and others) of the present invention. It is important, therefore, that the claims be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which:

FIG. 2 exemplarily shows a high-level flow chart for a broker capability augmenting method 200 according to an embodiment of the present invention;

FIGS. 4-9 exemplarily depicts a deployment of method 200 in an agricultural application according to an embodiment of the present invention.

DETAILED DESCRIPTION

Figure 1:
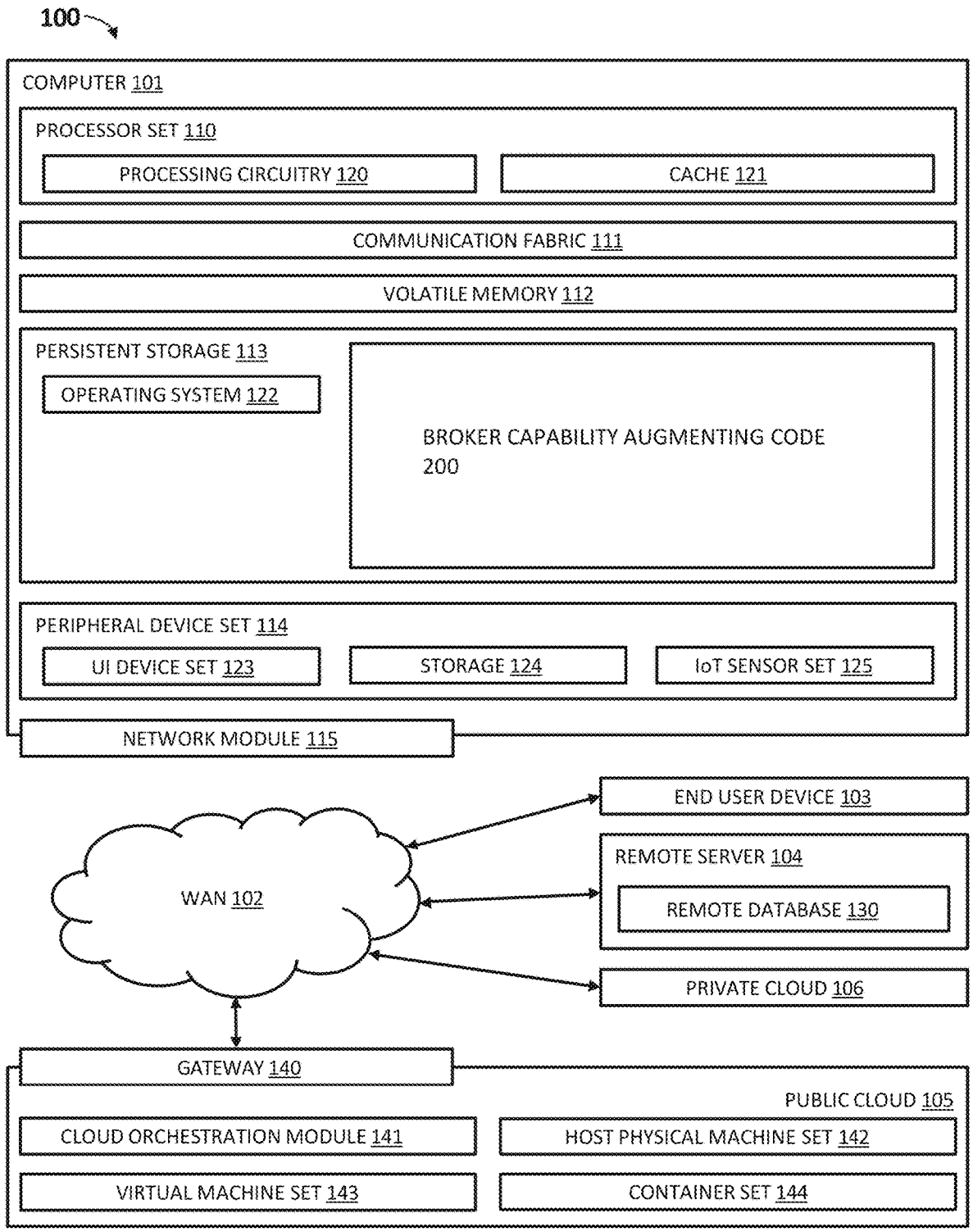
FIG. 1 depicts a computing environment 100 according to an embodiment of the present invention.

The invention will now be described with reference to FIGS. 1-9, in which like reference numerals refer to like parts throughout. It is emphasized that, according to common practice, the various features of the drawing are not necessarily to scale. On the contrary, the dimensions of the various features can be arbitrarily expanded or reduced for clarity.

With reference now to the exemplary method 200 depicted in FIG. 2, the invention may include various steps to increase broker capabilities on IoT environments which impacts positively on reducing network traffic, extending IoT battery life and scalability adding more capacity and intelligence on the broker endpoint which in practical scenarios could be a bottleneck.

The invention of method 200 includes adding intelligence to the broker by analyzing the data received by IoT sensors and their IoT topology as well.

Thus, instead of having cached values as usually does the conventional method, the broker, via method 200, is able to learn from sensor'(s) location(s) and topology on a specific area, and compute accurately other values based on the data coming from other sensors and might impact on leveraging data from other sensors to accurately compute data from others even if they have not sent anything.

For example, one exemplary issue with conventional IoT devices when using MQTT standard is the broker node. Despite the broker node being the middle coordinator along publisher and subscribers, there are different disadvantages such as network bandwidth which might impact in bottlenecks if lots of messages are transmitted at once, scalability when lots of messages are being sent constantly and battery usage on the IoT devices, especially the ones that are in remote or hard to access areas for replacement. All of this depends sometimes on the correct functioning of the broker. Also, replacing a used-up battery can be costly, both for the actual replacement equipment and for the downtime it creates, and sometimes the broker cannot act accordingly since there is a downtime for specific sensors. And, these issues lead to downtime within the network which is costly.

Therefore, the conventional techniques have the problem that they are unable to process large numbers of messages at once which causes bottlenecks, scalability issues, and battery usage issues.

In view of this, the inventors have considered a technical solution to increase broker capabilities on IoT environments which impacts positively on reducing network traffic, extends IoT battery life and scalability adding more capacity and intelligence on the broker endpoint which in practical scenarios could be a bottleneck.

The broker capability augmenting method 200 according to an embodiment of the present invention may act in a more sophisticated, useful and cognitive manner, giving the impression of cognitive mental abilities and processes related to knowledge, attention, memory, judgment and evaluation, reasoning, and advanced computation. A system can be said to be "cognitive" if it possesses macro-scale properties—perception, goal-oriented behavior, learning/memory and action—that characterize systems (i.e., humans) generally recognized as cognitive.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

With reference generally to FIGS. 1-9, by using machine learning to compute or predict hidden values based on sensor data correlated with neighborhood topology using the method 200, the MQTT broker (e.g., such as exemplarily depicted in FIG. 3) can make more accurate and efficient predictions, which can improve the overall performance and scalability of the system. Additionally, by computing specific values (i.e., the values are the specific variables to measure (temperature, light, moisture, etc.) on the broker rather than caching them, the system can save energy and reduce the computational load on individual IoT devices. Thus, the specific values computed on the broker can be estimated using a predictive model and improving by machine learning models as a result of the described method 200. Thereby, instead of getting data from actual sensors and caching them, the data can be computed and estimated using method 200 and the models computed in the method 200.

Figure 3:
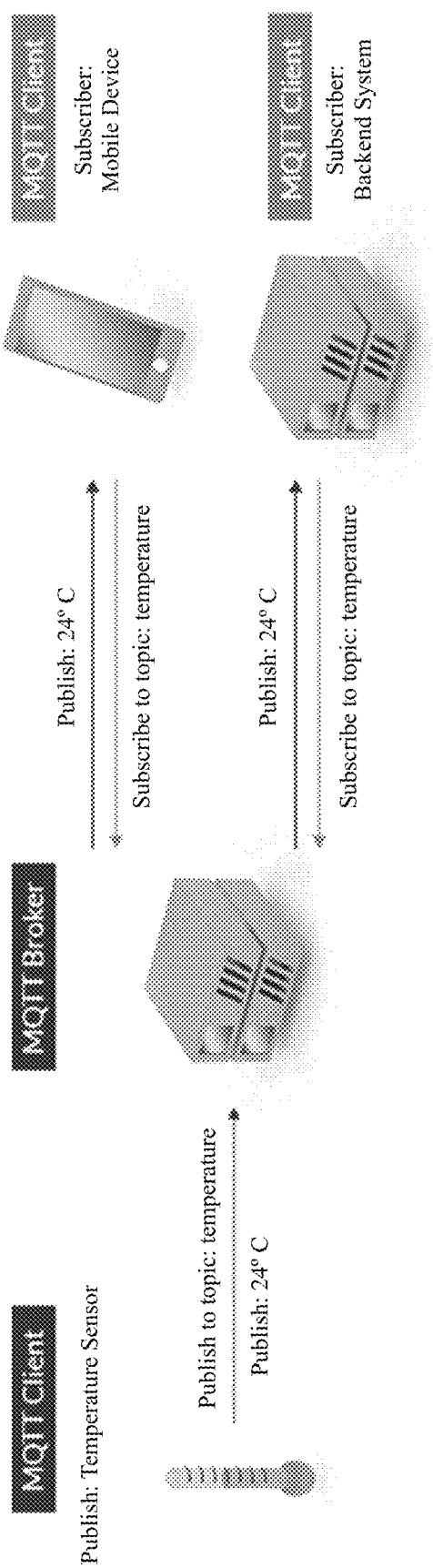
FIG. 3 exemplarily depicts a conventional MQTT broker network.

FIG. 3 exemplarily depicts a scenario with MQTT including a broker, a publisher (client with temperature sensor), and subscribers (server and mobile App).

The MQTT broker depicted in FIG. 3 is a central messaging server that acts as an intermediary between publishers and subscribers. It receives messages from publishers and delivers the messages to the interested subscribers. The broker is responsible for managing topics, subscriptions, and message distribution.

The publisher depicted in FIG. 3 is a client device equipped with a temperature sensor that wants to send temperature data to interested parties. The publisher establishes a connection to the MQTT broker and publishes temperature data to a specific topic, such as "temperature." The publisher sends messages in the form of MQTT packets, containing the temperature data, to the broker.

Subscribers as depicted in FIG. 3 are client devices that are interested in receiving temperature data from the publisher. They connect to the MQTT broker and subscribe to the "temperature" topic. When a subscriber subscribes to a topic, it indicates its interest in receiving messages published to that topic. The server and mobile app each establish their own connection to the broker and subscribe to the "temperature" topic.

As shown in FIG. 3, the publisher periodically reads temperature data from the sensor and publishes it as an MQTT message to the broker. The broker receives the published message and checks its topic. The broker then forwards the message to all the subscribers who have subscribed to the corresponding topic. The server and mobile app, being subscribers to the "temperature" topic, receive the temperature data from the broker. Each subscriber can process the received data according to its requirements. The MQTT follows a publish-subscribe communication model. The publisher is unaware of the subscribers and doesn't need to know who is interested in the temperature data. Subscribers, on the other hand, don't need to know the exact details of the publisher; they only need to subscribe to the relevant topic.

More specifically, with reference to FIG. 2, in step 201, data from an IoT neighborhood to detect IoT network topology is obtained over time by getting the actual data from sensors or by computing based on data block correlation.

In step 202, data from IoT devices in the IoT neighborhood is collected and preprocessed to remove noise and make the data usable for a machine learning model.

In step 203, input parameters to the machine learning model are defined. The input parameters can include, for example, the data from the IoT devices, the IoT network topology, connectivity information, and/or other relevant variables.

In step 204, the machine learning model is trained on the preprocessed data and the input parameters defined in step 203. The machine learning model can include, for example, a neural network, a Hidden Markov Model (HMM), etc.

In step 205, the trained machine learning model is deployed on the MQTT broker to enable the trained model to compute hidden values (e.g., values needed to be computed or estimated based on real data coming from IoT sensors) based on the IoT neighborhood and the IoT network topology and the data that they transmit. The trained machine learning model can be configured to update its parameters based on new data and topology changes.

Therefore, in step 205, by computing or estimating specific values from different topic (such as temperature, light, etc.) the network traffic may be reduced since not all sensors will be massively transmitting data periodically impacting in reducing network congestion.

In step 206, publisher's data is correlated and error deltas for the publisher's data are computed. That is, based on the trained machine learning model, step 206 makes sure based on the neighbor's data to try to compute other's publisher's data (e.g., neighbors, a publisher is an IoT sensor which can publish a variable). Based on the error delta computed, the method can reduce or increase the publisher data transmission rate, always ensuring that data is used properly to compute others publisher sensors' hidden values (e.g., computed or estimated values from the neighborhood). This can also be a way to detect and make aware if certain publishers are always producing error deltas, likely from an issue with the specific publishers.

For step 206, one example could be where one topic to measure is temperature, usually 23° C., and deltas are around 1° C. Thus, in this case deltas are minimum, and degrees are expected. But in other cases, the temperature could increase a lot, for instance to 30° C. and deltas are for 5° C. That delta change is a lot (i.e., relatively large), since usually deltas are 1° C., and that anomaly could trigger the need of getting actual measurement from the sensor and not coming from the correlation analysis.

Therefore, step 206 enables the sensors to be able to "sleep more" (i.e., not transmitting data) and be awake only when needed. In a case determined by step 206 that there are some large deltas (for instance, one value from a neighbor sensor was 40% more than it's previous value), that means the neighborhood needs to send actual data to correct the estimate from the broker. In those cases that information will be necessary on other cases the sensors will be sleeping and that impacts in increasing battery life. In other words, step 206 optimizes the transmission of data which in return extends the battery life of the IoT sensors by not having the IoT sensors transmit unnecessarily.

In step 207, the performance of the machine learning model is monitored on the MQTT broker and its energy consumption, intelligence, predictions, and scalability are optimized. This involves monitoring and analyzing the energy consumption, computational load, and other performance metrics to make changes as needed. For instance, if the deltas are constantly really high (e.g., +/−10° C.) for temperature, then this means some predictions are not really accurate, and thus possibly it will be necessary to re-train the model and obtain more data to learn and deploy a new model once trained. The idea is to minimize energy consumption on the endpoints, and computational loads as well as predictions are accurate. If not, then the model will act as a regular (conventional) non-intelligence broker and ask all sensors to get data so the model can be re-trained again. Once trained, the updated model is re-deployed and monitored constantly.

That is, step 207 makes the broker smarter with the ability to track the IoT neighborhood and estimate values from the neighbors based on less data streams. Usually, a broker can handle certain number of sensors, usually when they are at the limit congestions may occur impacting on bottlenecks and having overhead on the data. One usual solution to avoid that to happen is to segment the IoT sensor network adding another broker. In our proposal, the idea is to reduce the traffic, hence more sensors can be handled.

And, as a result of the execution of step 207, the broker is made smarter with the ability to track the IoT neighborhood and estimate values from the neighbors based on less data streams. Typically, a broker can handle certain number of sensors, usually as when they are at the limit congestions may occur impacting on bottlenecks and having overhead on the data. One usual solution to avoid that happening is to segment the IoT sensor network adding another broker. In the invention, the idea is to reduce the traffic by estimating data from less data streams or having some sensors be asleep, hence more sensors can be handled.

In step 208, new data from the IoT neighborhood is collected, preprocessed, and utilized to retrain the machine learning model. After the machine learning model is retrained with the new data, the updated machine learning model is redeployed on the broker. Indeed, as the topology and data transmitted by the IoT devices evolve, the machine learning model must also evolve. Thereby, the invention can constantly evolve to new incoming data.

Thus, method 200 includes collecting data from IoT sensors, preprocessing the data, training a machine learning model on the data, deploying the trained model on the MQTT broker, monitoring and optimizing the model, and continuously improving the model over time.

And, by enabling the computation of hidden values from other data streams, the amount of active sensors needed may be limited.

By executing steps 201-208, the invention obtains a granularity level so that the MQTT broker may be able to act accordingly and more intelligently knowing IoT sensor mapping. This results in less network usage, reduced bottleneck(s) and augmenting Quality of Service (QOS), emergency detection more accurately, battery lifetime increasing, and lower costs of maintenance.

FIGS. 4-9 exemplarily depict a reduction to practice of the method 200 in an agricultural embodiment.

Agriculture is an exemplary use case and depicted in FIGS. 4-9. The agricultural embodiment exemplifies an exemplary massive scenario. The purpose is to have massive sensors in greenhouses with different variables to measure. Executing the steps of the method 200 may be able to optimize the data transmission.

For instance, a specific fruit in Japan is very expensive to maintain and it's very sensitive so the idea is constantly sending data about different variables such as temperature, moisture, light, etc. In a common scenario, all sensors will be sending the data over and over (i.e., draining the battery and bandwidth) through different topics through broker's publisher/subscriber mechanism.

The method 200 can improve the conventional agricultural scenarios such as shown in FIGS. 4-9 by sending that different data, but instead of sending all, aim to avoid massive data streams. The invention can catch values from the neighbors and use different learning techniques on the broker to estimate the neighborhood values and with that reduce the data stream transmission periods and frequency from the sensor to avoid congestions. For example, by using the data neighborhood IoT sensors, specific values can be computed rather than transmitting from a sensor to avoid congestion and reduce battery usage.

Figure 4:
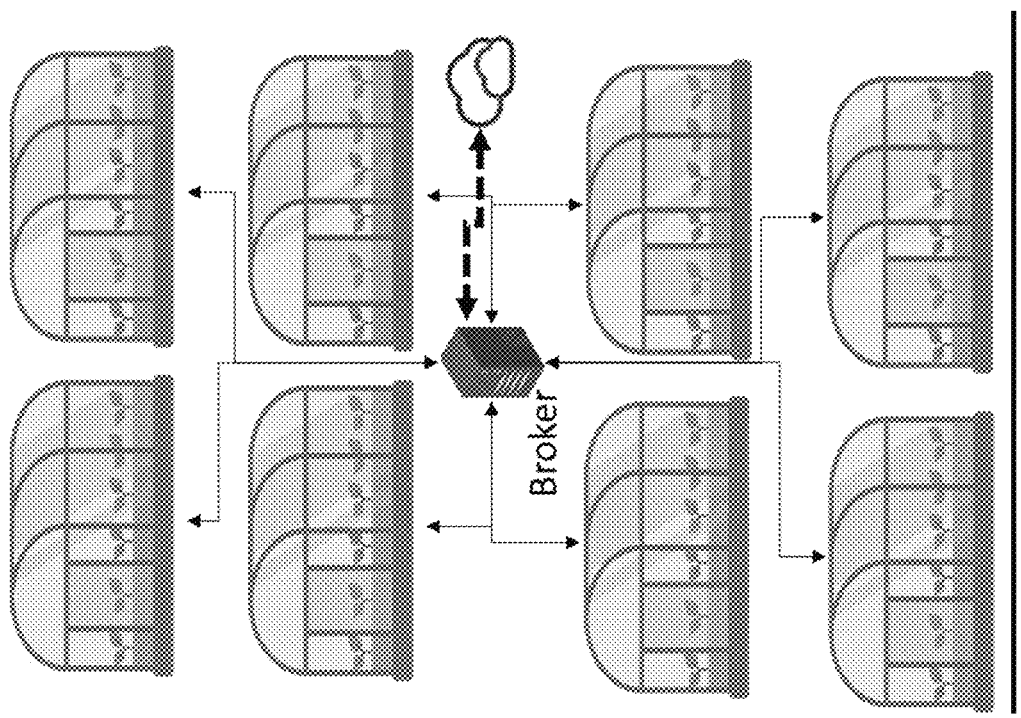

A plurality of greenhouses connected to a broker are shown in FIG. 4. Usually, the brokers handle a large amount of traffic, and also, depending on the traffic they might generate bottleneck(s), and for that reason their scalability is reduced. Scalability and quality on the IoT devices are hot topics due to the increasing demand. This implies that brokers need to handle more and more IoT sensors and all the implications that may arise.

But, despite MQTT protocol being good in terms of energy, management and others, it does not solve problems when high-demand of IoT devices scenarios occurs.

FIG. 5 exemplary depicts an embodiment of the method 200 reduced to practice. FIG. 5 includes a sub-set of IoT sensors in the greenhouse which communicate with an MQTT broker. The invention creates a mesh topology map from the IoT sensors and their neighborhood to reflect specific sensor location(s) (e.g., the grid depicted in FIG. 5). As shown in FIG. 5, only six sensors are transmitting data while the rest of the sensors have their values computed based on the trained model of step 200. Thereby, instead of using 54 sensors to send data, only 6 are utilized and the rest have their values computing which reduces congestion in the network.

Based on the data type to collect (topics), the purpose is to train a model and make sure having the data updated based on data from the neighborhood taking advantage of the scheduled sensors data sent. The grid is updated to have actual data coming from sensors and virtual data computation from neighborhood values and the trained model.

Figure 6:
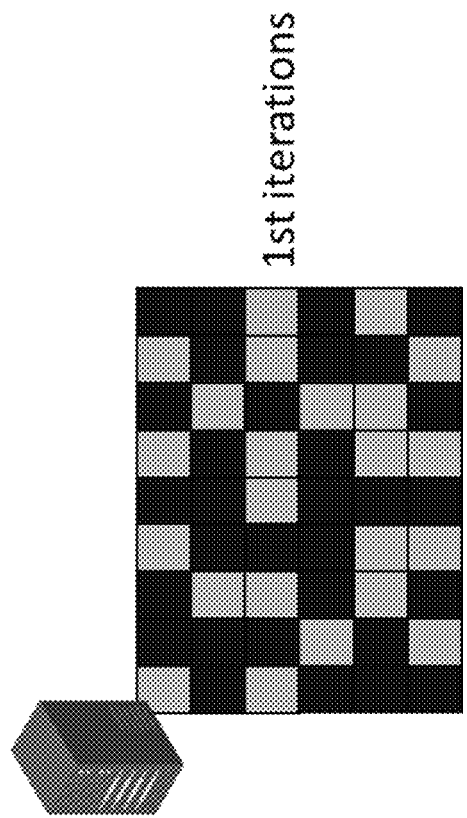
Figure 7:
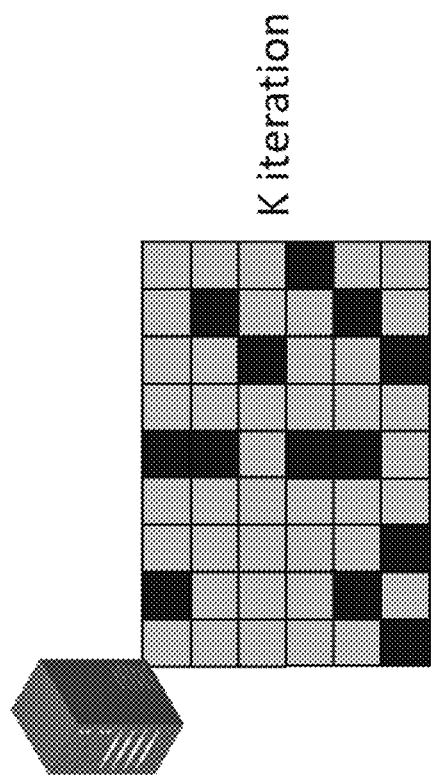
Figure 8:
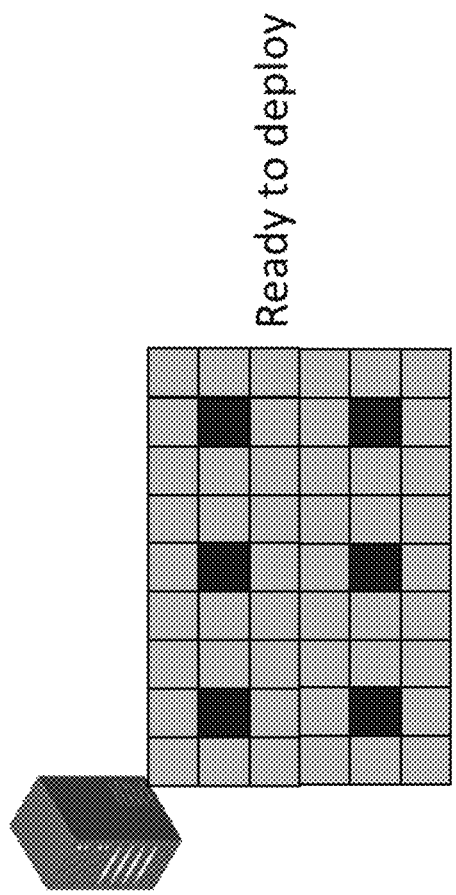

FIGS. 6-8 depict the grid in a first iteration, k iteration, and being ready to deploy.

For example, the IoT neighborhood is discovered. The invention collects and starts training the model. At the beginning, the scheduled topics will be performed as usual, but at the same time, the invention on the broker would be able to learn in parallel comparing actual data coming from sensors to increase accuracy.

The model is trained from the first iteration to being ready to deploy, for instance, using an HMM to compute possible observations to close feedback loop. As shown in the progression from 600, 700, to 800, the amount of sensors is reduced as the model "improves". That is, in FIG. 6, the mesh 600 requires most of the sensors to transmit data. After running the model determines via the method 200, k iterations (i.e., FIG. 7 mesh 700) are computed until the final deployment mesh 800 of FIG. 8 is computed. By improving the model and based on deltas, the amount of required sensors can be reduced over time as neighborhood sensors are able to intelligently determine the data that would have been output by the sensors that are inactive in the deployed mesh.

As is visually appreciated by the difference in the amount of sensors required in the deployed mesh compared with the 54 sensors of the entire network shown in FIG. 6, bandwidth and congestion are improved and battery life is improved (i.e., the amount of sensors turned on is reduced which intuitively improves battery life).

Figure 9:
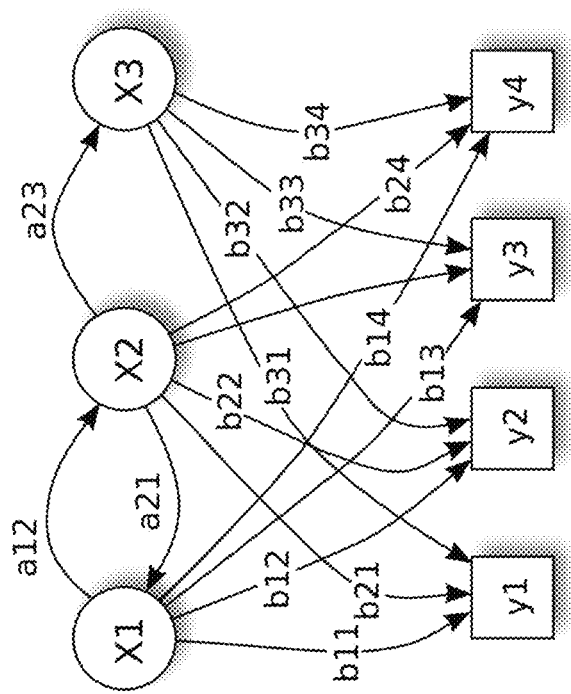

FIG. 9 exemplarily depicts the HMM training. In FIG. 9, X is the states, y is the possible observations, a is the state transition probabilities, and b is the output probabilities. In one embodiment, the invention can compute and predict hidden values correlating real data coming from regular, reduced or increased transmission periods. In other words, FIG. 9 exemplarily depicts the HMM training that can be used to move from the original mesh 600 to the deployed mesh 800.

Once deployed, the mechanism will be adapting the publisher/subscribe rules to decrease the period for a sensor to transmit information and sleep instead. And, the deployed model has continuous improvement by changing those rules based on accuracy.

Thereby, the invention enables neighborhood and topology correlation to dynamically modify transmission periods and data accuracy by a topology surrounding schema impacting on an IoT device's battery lifetime. The invention therefore improves upon the technology itself by replacing the need for common methods currently in existence such as caching. The invention increases the broker's capabilities for predicting hidden values.

Indeed, the invention may augment broker's capabilities by adding more intelligence on it. The invention may ensure the broker start learning from the actual sensors' values and try to correlate from other sensors the neighborhood values and based on the deltas reduce or augment transmission periods, impacting positively on the IoT sensor's common issues on massive scenarios such as battery life, network congestion, broker bottle-neck, and others.

The invention covers broker capabilities by adding intelligence at the edge and involves neighborhood and topology creation for optimizing network traffic by computing and correlating data, neighborhood and topology correlation to dynamically modify transmission periods and data accuracy by a topology surrounding schema impacting on IoT device's battery lifetime, compute and predict hidden values correlating real data coming from regular, reduced or increased transmission periods, and replacement of common methods such as caching, increasing broker capabilities for predicting hidden values accurately.

Exemplary Aspects, Using a Computing Environment

With reference now to FIG. 1, computing environment 100 contains an example of an environment for the execution of at least some of the computer code involved in performing the inventive methods, such as broker capability augmenting code 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented method for increasing a capability of a Message Queuing Telemetry Transfer (MQTT) broker in an Internet-of-Things (IoT) network, comprising:
    obtaining data from an IoT neighborhood to detect an IoT network topology over time;
    collecting data published from IoT devices in the IoT neighborhood;
    defining an input parameter to a machine learning model;
    training the machine learning model on the collected data and the input parameter; and
    adjusting a data transmission rate of at least one IoT device publisher based on output of the trained machine learning model; and
    deploying the trained machine learning model on the MOTT broker to enable the trained machine learning model to compute a hidden value based on the IoT neighborhood and IoT network topology.

2. The computer-implemented method of claim 1, further comprising configuring the machine learning model to update the input parameter based on new data and a topology change of the IoT network topology.

3. The computer-implemented method of claim 1, further comprising:
    correlating the IoT device publisher data and computing an error delta based on the machine learning model; and
    based on the error delta computed, reducing or increasing the IoT device publisher data transmission rate.

4. The computer-implemented method of claim 1, further comprising:
   monitoring a performance of the machine learning model on the MQTT broker; and
   optimizing at least one of an energy consumption, an intelligence, a prediction, and a scalability based on a result of the monitoring.

5. The computer-implemented method of claim 1, wherein the obtaining obtains the data from the IoT neighborhood by obtaining actual data from sensors.

6. The computer-implemented method of claim 1, wherein the obtaining obtains the data from the IoT neighborhood by computing based on data block correlation.

7. The computer-implemented method of claim 1, wherein the collected data from the IoT devices is preprocessed to remove noise such that the collected data is usable for the machine learning model.

8. The computer-implemented method of claim 1, wherein the input parameter includes at least one of:
   the data from the IoT devices;
   the IoT network topology; and
   connectivity information of the IoT neighborhood.

9. The computer-implemented broker capability augmenting method of claim 1, embodied in a cloud-computing environment.

10. A broker capability augmenting computer program product for increasing a capability of a Message Queuing Telemetry Transfer (MQTT) broker in an Internet-of-Things (IoT) network, the broker capability augmenting computer program product comprising a computer-readable storage medium having program instructions embodied therewith, the program instructions executable by a computer to cause the computer to perform:
   obtaining data from an IoT neighborhood to detect an IoT network topology over time;
   collecting data published from IoT devices in the IoT neighborhood;
   defining an input parameter to a machine learning model;
   training the machine learning model on the collected data and the input parameter;
   adjusting a data transmission rate of at least one IoT device publisher based on output of the trained machine learning model; and
   deploying the trained machine learning model on the MOTT broker to enable the trained machine learning model to compute a hidden value based on the IoT neighborhood and lol network topology.

11. The broker capability augmenting computer program product of claim 10, further comprising configuring the machine learning model to update the input parameter based on new data and a topology change of the IoT network topology.

12. The broker capability augmenting computer program product of claim 10, further comprising:
   correlating the IoT device publisher data and computing an error delta based on the machine learning model; and
   based on the error delta computed, reducing or increasing the IoT device publisher data transmission rate.

13. The broker capability augmenting computer program product of claim 10, further comprising:
   monitoring a performance of the machine learning model on the MQTT broker; and
   optimizing at least one of an energy consumption, an intelligence, a prediction, and a scalability based on a result of the monitoring.

14. The broker capability augmenting computer program product of claim 10, wherein the obtaining obtains the data from the IoT neighborhood by obtaining actual data from sensors.

15. The broker capability augmenting computer program product of claim 10, wherein the obtaining obtains the data from the IoT neighborhood by computing based on data block correlation.

16. A broker capability augmenting system for increasing a capability of a Message Queuing Telemetry Transfer (MQTT) broker in an Internet-of-Things (IoT) network, the broker capability augmenting system comprising:
   a processor; and
   a memory, the memory storing instructions to cause the processor to perform:
      obtaining data from an IoT neighborhood to detect an IoT network topology over time;
      collecting data published from IoT devices in the IoT neighborhood;
      defining an input parameter to a machine learning model;
   training the machine learning model on the collected data and the input parameter;
      adjusting a data transmission rate of at least one IoT device publisher based on output of the trained machine learning model; and
      deploying the trained machine learning model on the MQTT broker to enable the trained machine learning model to compute a hidden value based on the IoT neighborhood and IoT network topology.

17. The broker capability augmenting system of claim 16, embodied in a cloud-computing environment.

* * * * *